US009834910B2

(12) United States Patent
Van Dommele

(10) Patent No.: US 9,834,910 B2
(45) Date of Patent: Dec. 5, 2017

(54) DEVICE AND METHOD FOR UTILIZING A SURFACE FOR A VARIABLE FUNCTION

(75) Inventor: Pieter Johannes Van Dommele, Sliedrecht (NL)

(73) Assignee: Cablean IP B. V., Sliedrecht (NL)

( * ) Notice: Subject to any disclaimer, the term of this patent is extended or adjusted under 35 U.S.C. 154(b) by 149 days.

(21) Appl. No.: 13/378,189

(22) PCT Filed: Jun. 18, 2010

(86) PCT No.: PCT/NL2010/000100
§ 371 (c)(1),
(2), (4) Date: Feb. 16, 2012

(87) PCT Pub. No.: WO2011/002282
PCT Pub. Date: Jan. 6, 2011

(65) Prior Publication Data
US 2012/0138762 A1 Jun. 7, 2012

(30) Foreign Application Priority Data

Jun. 18, 2009 (NL) ...................................... 2003041

(51) Int. Cl.
*E04D 13/03* (2006.01)
*F24J 2/54* (2006.01)
(Continued)

(52) U.S. Cl.
CPC ............ *E03B 3/02* (2013.01); *E04D 13/0351* (2013.01); *F24J 2/54* (2013.01); *G09F 11/025* (2013.01);
(Continued)

(58) Field of Classification Search
CPC ............ E04F 10/005; E04F 2011/1876; E04D 13/0351; E06B 2009/2476;
(Continued)

(56) References Cited

U.S. PATENT DOCUMENTS 3,472,305 A * 10/1969 Lefes ...................... E06B 9/386
156/65
4,067,319 A * 1/1978 Wasserman ............ F24J 2/0494
126/600

(Continued)

FOREIGN PATENT DOCUMENTS

DE 202006009100 U1 9/2006
DE 102006016333 A1 10/2007
(Continued)

OTHER PUBLICATIONS

InnovationQ-Plus Search; IP.com; Jul. 21, 2017.*

Primary Examiner — Ryan D Kwiecinski
(74) Attorney, Agent, or Firm — The Webb Law Firm

(57) ABSTRACT

A device for utilizing a surface, such as the surface of a floor, outside wall or roof, for a variable function, including a first functional element with an active surface area the size of at least a part of the surface, at least one second functional element with an active surface area the size of at least a part of the surface, and a rotatable carrier for varying, on at least a part of the surface, the functional element with which the surface is utilized. A method for utilizing a surface for a variable function is also shown.

10 Claims, 6 Drawing Sheets

(51) Int. Cl.

| | | |
|---|---|---|
| G09F 11/02 | (2006.01) | |
| E03B 3/02 | (2006.01) | |
| E04D 13/035 | (2006.01) | |
| H02S 30/20 | (2014.01) | |
| H02S 20/23 | (2014.01) | |
| H02S 20/22 | (2014.01) | |
| H02S 20/30 | (2014.01) | |
| F24J 2/52 | (2006.01) | |
| H02S 20/00 | (2014.01) | |

(52) U.S. Cl.
CPC .............. *H02S 20/23* (2014.12); *H02S 30/20* (2014.12); *F24J 2/5266* (2013.01); *F24J 2/541* (2013.01); *F24J 2002/5468* (2013.01); *H02S 20/00* (2013.01); *H02S 20/22* (2014.12); *H02S 20/30* (2014.12); *Y02B 10/12* (2013.01); *Y02B 10/20* (2013.01); *Y02B 80/32* (2013.01); *Y10T 29/49826* (2015.01)

(58) Field of Classification Search
CPC .... F24J 2002/5468; F24J 2/54; G09F 11/025; Y02B 80/32; H02S 20/22; H02S 20/23; H02S 20/24; H02S 20/26; H02S 20/30
USPC ....... 52/1, 173.3, 473, 12; 136/248; 126/600, 126/621, 623, 634; 160/236; 49/80.1
See application file for complete search history.

(56) References Cited

U.S. PATENT DOCUMENTS

| | | | | |
|---|---|---|---|---|
| 4,193,391 | A | | 3/1980 | White |
| 4,297,521 | A | * | 10/1981 | Johnson ..................... F24J 2/06 126/605 |
| 4,334,120 | A | * | 6/1982 | Yamano ................... F24J 2/055 126/659 |
| 4,733,506 | A | * | 3/1988 | Gunnarshaug ............ E04C 3/06 126/623 |
| 4,820,020 | A | * | 4/1989 | Terrill ..................... E04D 13/03 359/592 |
| 5,203,394 | A | * | 4/1993 | Hailey ..................... E06B 9/36 160/166.1 |
| 5,221,363 | A | * | 6/1993 | Gillard .................... E06B 9/264 136/248 |
| 5,297,353 | A | * | 3/1994 | Ghalayini ............. G09F 11/025 40/219 |
| 5,392,577 | A | * | 2/1995 | D'Onofrio, Jr. ........ E06B 7/082 49/74.1 |
| 5,562,459 | A | * | 10/1996 | Durlach ................ G09F 11/025 345/110 |
| 6,000,170 | A | * | 12/1999 | Davis ..................... A01G 9/225 47/17 |
| 6,493,994 | B1 | * | 12/2002 | Lucas ................................ 52/12 |
| 7,673,853 | B2 | * | 3/2010 | Ebeling ................... E04H 17/16 256/1 |
| 7,703,246 | B2 | * | 4/2010 | Chang ...................... F24J 2/541 248/183.4 |
| 2004/0140462 | A1 | * | 7/2004 | Rowley ................. E04H 17/143 256/27 |
| 2008/0196758 | A1 | * | 8/2008 | McGuire ................. F03D 9/007 136/245 |
| 2010/0000134 | A1 | * | 1/2010 | MacKler ............... G09F 11/025 40/492 |
| 2010/0154999 | A1 | * | 6/2010 | Oh .......................... E06B 9/322 160/7 |
| 2010/0242948 | A1 | * | 9/2010 | Fleischmann ................. 126/577 |
| 2011/0005573 | A1 | * | 1/2011 | Chang ....................... F24J 2/541 136/245 |
| 2011/0167735 | A1 | * | 7/2011 | Sumner ..................... E04D 1/28 52/1 |
| 2011/0192551 | A1 | * | 8/2011 | Rance ..................... E06B 9/264 160/127 |
| 2012/0031018 | A1 | * | 2/2012 | Kapany ................. F24J 2/0433 52/173.3 |
| 2012/0067337 | A1 | * | 3/2012 | Hall ....................... F24J 2/0007 126/600 |
| 2012/0111318 | A1 | * | 5/2012 | Park ........................ F24J 2/541 126/605 |
| 2012/0266941 | A1 | * | 10/2012 | Ozeki ..................... F24J 2/5233 136/246 |
| 2013/0112189 | A1 | * | 5/2013 | Ba-Abbad .................. F24J 2/08 126/605 |
| 2013/0118099 | A1 | * | 5/2013 | Scanlon ................. F24J 2/5233 52/173.3 |
| 2013/0194162 | A1 | * | 8/2013 | Autenzeller .......... G09F 11/025 345/1.3 |
| 2014/0125134 | A1 | * | 5/2014 | Van Straten ............ H02S 30/20 307/72 |
| 2016/0020723 | A1 | * | 1/2016 | Inoue ..................... H02S 20/10 136/246 |
| 2016/0036375 | A1 | * | 2/2016 | Ansari ..................... F03D 13/40 136/245 |
| 2017/0126175 | A1 | * | 5/2017 | Drwal ..................... H02S 50/00 |

FOREIGN PATENT DOCUMENTS

| | | |
|---|---|---|
| EP | 1993145 A2 | 11/2008 |
| WO | 2007084517 A2 | 7/2007 |
| WO | 2010003102 A1 | 1/2010 |

* cited by examiner

DEVICE AND METHOD FOR UTILIZING A SURFACE FOR A VARIABLE FUNCTION

BACKGROUND OF THE INVENTION

Field of the Invention

The present invention relates to a device and method for utilizing a surface for a variable function. The invention relates particularly to the utilizing of a surface, such as the surface of a floor, outside wall or roof, in environmentally-friendly manner or for energy production or water collection or for enhancing the quality of life.

Description of Related Art

It is per se known to use surfaces such as the surface of a floor, outside wall or roof for environmentally-friendly purposes such as binding fine dust or producing energy, for instance using solar panels. Particularly in areas where available surfaces are relatively scarce, such as urban areas, it is however a drawback that a determined function for utilizing a surface is only possible for a limited amount of time. Solar energy can logically only be generated when there is sun, and so in any case only during the day, and water collection for instance can only take place during precipitation. These drawbacks form a particular problem in urban areas where space and usable surfaces are scarce.

It is therefore an object of the present invention to provide a method and device which at least partially resolve the above stated problem or provide a usable alternative.

SUMMARY OF THE INVENTION

The invention provides for this purpose a device for utilizing a surface, such as the surface of a floor, wall, outside wall or roof, for a variable function, comprising a first functional element with an active surface area the size of at least a part of the surface, and at least a second functional element with an active surface area the size of at least a part of the surface, in addition to means for varying, on at least a part of the surface, the functional element with which the surface is utilized. The surface of the floor, wall, outside wall or roof can be that of a residential building, of an office building, but also the surface of a road, dike, noise protection barrier or a surface provided by other random object, vehicle or vessel, or a location.

Because it is possible to vary the functional element with which the surface is utilized, the use of the surface can be adapted in each case to the current requirement or the current possibilities for producing energy or applications which are environmentally-friendly or enhance quality of life. In order to enable variation the first and the second functional elements differ from each other.

At least one functional element is particularly chosen from the group of: a solar panel, a cold or heat storage element, a water absorbing, collecting or buffering element, a green element such as a grass cover or moss mat or other element with growth thereon, a fine dust-binding element, an emission-binding and/or neutralizing element such as an NOx-binding and/or neutralizing or SOx-binding and/or neutralizing element, an element bearing an image, a wind energy generating element, a $CO_2$-neutralizing element, a daylight control element, a sound-absorbing element, and element for algal culture (bioenergy), food culture, reflection or artificial grass. The at least second functional element can here be chosen from the same group, but is logically preferably different from the first element. It is however possible to opt to apply a determined element a number of times, for instance when it is foreseen that intervals between maintenance last so long that the element for instance is contaminated or saturated.

The means for varying the functional element preferably comprise at least one displacing means for at least a portion of a functional element. Utilization of the surface area can hereby be modified at all times. The displacing means can be adapted to displace only a portion of the functional element or to arrange the whole functional element partially on the surface or remove it therefrom. The displacing means can also be adapted to displace or interchange a plurality of functional elements.

For this purpose at least one displacing means can comprise a rotatable carrier, whereby at least two functional elements are carried such that during rotation an active surface area of at least one functional element can be placed at a predetermined orientation, such as a position or angle, to the surface. The manner in which the surface is utilized can in this case be changed by rotating the carrier, which can optionally take place in automated manner.

The carrier particularly comprises a tube which is rotatable in axial direction and has a round or polygonal, and in particular a triangular or square cross-section, wherein at least one surface of the jacket of the tube carries a functional element. The surface can be placed in an orientation suitable for use by rotating such a carrier. This can be an orientation parallel to (or above) the surface, but also a most suitable orientation for the relevant element. In the case of a solar panel the panel can for instance extend perpendicularly of the direction of incidence of the sunlight and be rotated subject thereto and, in the case of an image, this image can for instance extend parallel to the surface.

The carrier can be adapted in at least one axial angle position to hold a liquid such as rainwater, and be given a substantially hollow form for this purpose, or at least comprise a storage space for the liquid and more preferably have an at least partially moisture-permeable jacket for the purpose of absorbing and/or relinquishing the liquid. The collection of rainwater can serve here for the subsequent use of this rainwater, for instance as irrigation water, or to relieve drainage systems during heavy precipitation, wherein a buffer is formed which can be emptied at any appropriate moment. An at least partially moisture-permeable cloth suitable for this purpose comprises for instance a water-permeable cloth which can be provided at the same time with an imprint so that it can function as advertising message. The cloth can however be provided with an imprint which, on the contrary, ensures that the device has the least disruptive optical effect possible, or for instance absorbs or reflects light in order to exclude or collect heat.

In an alternative embodiment at least one displacing means comprises a translatable carrier, whereby at least one, but preferably at least two, functional elements are carried such that during translation an active surface area of at least one functional element can be placed at a predetermined orientation, such as a position or angle, to the surface. A translatable carrier can, for instance when use is made of a conveyor belt or a chain, result in a simple construction with which a large part of the surface can be utilized.

Varying the function for which the surface is utilized can be done manually, although the device can also be provided with a control device for varying at least a functional element on the basis of an input, such as a manual input or an input provided by a sensor or external device. A plurality of devices can be coupled for this purpose to a central unit adapted to control the overall desired functionality by means of the input for the purpose of providing an input to each of the respective devices.

The device can be arranged afterward on the surface, and so be removable, or be incorporated integrally in a panel which can be used as wall, roof or the like, and so be permanently attached.

BRIEF DESCRIPTION OF THE DRAWINGS

The invention will now be elucidated on the basis of the following non-limitative figures. Herein.

DESCRIPTION OF THE PREFERRED EMBODIMENTS

Figure 1:
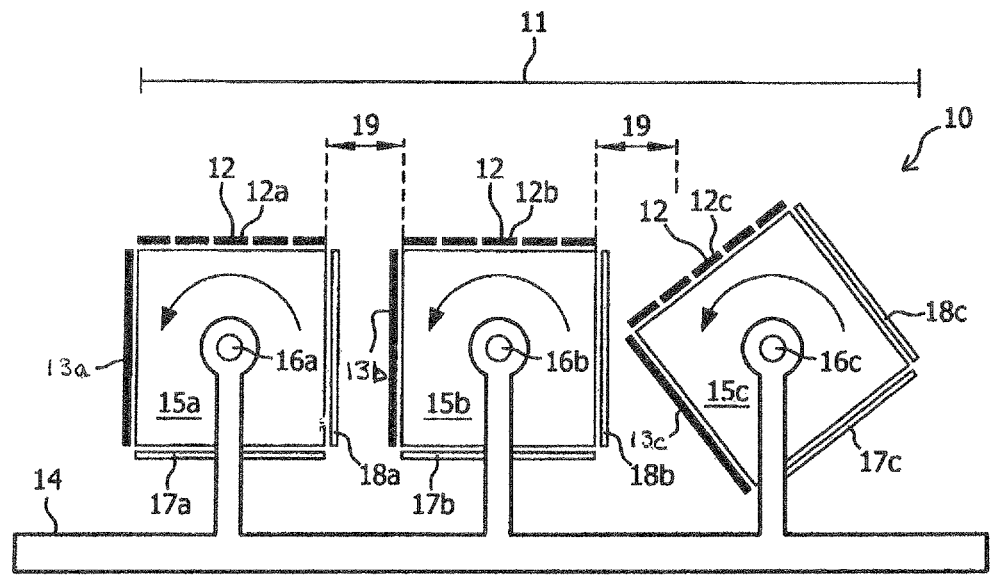
FIG. 1 shows a schematic view of a first embodiment of a device according to the present invention.

FIG. 1 shows a device 10 according to the present invention for utilizing a surface 14, such as the surface of a floor, outside wall or roof, for a variable function. In FIG. 1 the distance 11 indicates the width of the surface, wherein the surface extends further perpendicularly of the plane of the drawing. The surface is formed here by a floor 14, but it will be apparent that the device is also suitable for application on any surface, such as the surface of an outside wall or roof, or a ground surface, a dike surface, a sloping surface etc. The device comprises a first functional element 12 consisting of a solar panel formed by a number of sub-elements 12a, 12b, 12c, each situated on respective carriers 15a, 15b, 15c. Carriers 15a, 15b and 15c are formed as tubes extending perpendicularly of the plane of the drawing and disposed rotatably around rotation shafts 16a, 16b, 16c. By means of this rotation a second functional element 13 formed by second functional sub-elements 13a, 13b, 13c can be rotated to the top side, whereby the functional element with which the surface is utilized is changed from functional element 12 to functional element 13a, 13b, 13c, 17a, 17b, 17c, 18a, 18b, 18c, wherein functional element 13a, 13b, 13c, 17a, 17b, 17c, 18a, 18b, 18c is for instance formed by any element from the group of a cold or heat storage element, a water-absorbing, collecting or buffering element, a green element such as a grass cover or moss mat or element with other growth thereon, a fine dust-binding element, an emission-binding and/or neutralizing element such as an NOx-binding and/or neutralizing or SOx-binding and/or neutralizing element, a wind energy generating element. In the shown embodiment the functional elements can extend in an activated mode parallel to each other, and in particular also parallel to floor 14, although it is also possible —for instance when solar panels 12a, 12b, 12c are activated—to place each of these in an optimum orientation relative to the incident sunlight, so that they possibly lie parallel to each other but not necessarily parallel to the surface 14 defined by the floor.

Not shown are blades optionally arranged in or partially around or peripherally of the carrier for the purpose of generating wind energy. The carriers, particularly when they are not being used at least wholly for liquid storage, can also be adapted as energy storage medium, for which purpose they can be embodied as battery. Such batteries can comprise conventional battery acid but can, for instance for safety reasons, also be embodied as salt batteries. The energy storage can however also take place in the form of heat or cold storage.

Figure 2:
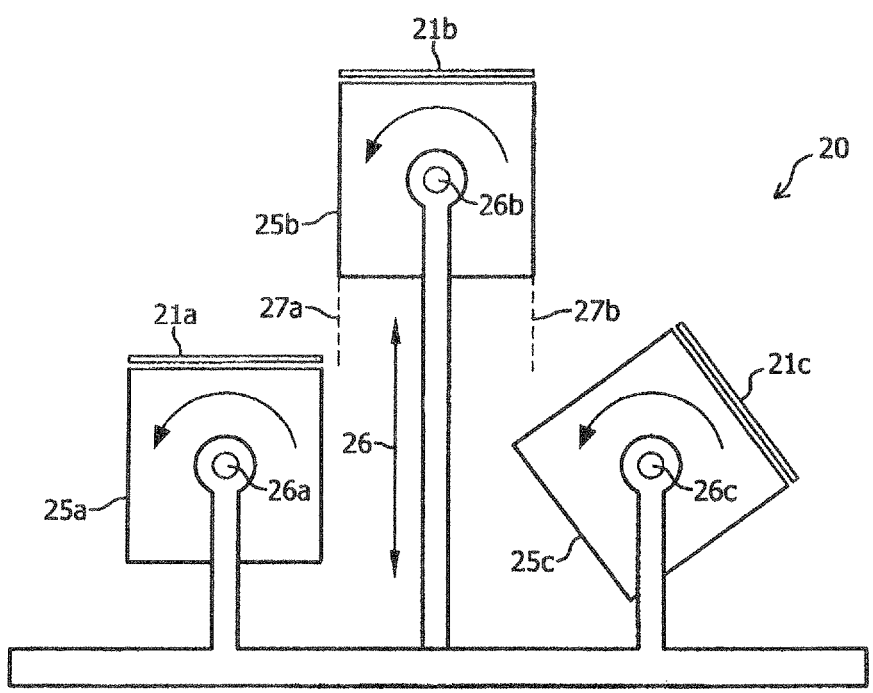
FIG. 2 shows a schematic view of a second embodiment of a device according to the present invention.

FIG. 2 shows a second embodiment 20 of the present invention. The second embodiment 20 largely corresponds to the first embodiment 10, except that second carrier 25b is displaceable in the direction of arrow 26. Second carrier 25b does not hereby impede first carrier 25a and third carrier 25c during rotation. In the embodiment 10 of FIG. 1 carriers 15a, 15b, 15c are placed at a mutual distance 19 in order to prevent this obstruction, this having the drawback however that unused intermediate spaces 19 are present between the functional sub-elements 15a, 15b, 15c during use. This drawback is obviated by the embodiment 20 of FIG. 2, in which the broken lines 27a, 27b show how the functional sub-elements 21a, 21b, 21c abut each other in an activated mode, wherein second carrier 25b is placed between first carrier 25a and third carrier 25c. Another way of obviating the drawback of the embodiment of FIG. 1 is to make use of carriers with a triangular section, although this results in more limited possibilities for the placing of functional elements.

Carriers 15a, 15b, 15c, 21a, 21b, 21c are preferably embodied as removable and easily replaceable cassettes, and are provided on each of their sides with a functional element. Their rotation points 16a, 16b, 16c, 26a, 26b, 26c are preferably also embodied as throughfeed for electric cabling or, if possible, for heat and/or cold or liquid transfer. In this latter function the device according to the present invention can be coupled to an air-conditioning system optionally already present in a building, on the roof or on the outside wall of which the device according to the present invention is placed.

Figure 3:
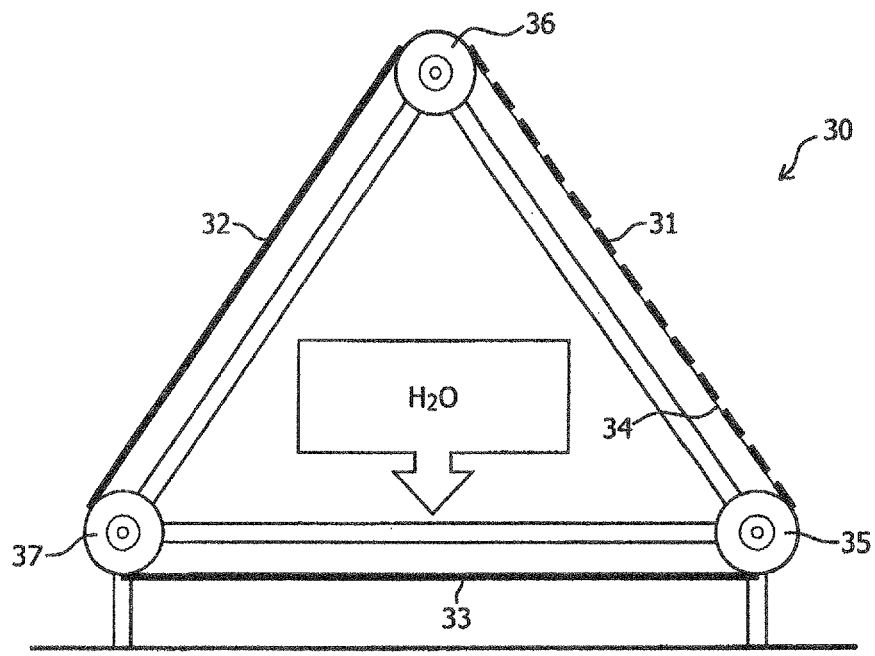
FIG. 3 shows a schematic view of a third embodiment of a device according to the present invention.

FIG. 3 shows a subsequent embodiment 30, wherein functional elements 31, 32, 33 are arranged on a belt 34. The functional elements can be translated by moving belt 34, which can be realized by rotating rollers 35, 36, 37, wherein one or more functional elements at a time are brought into an active mode of use. In the shown example the functional elements 32 and 34 are activated, while functional element 33 is in a rest position, wherein it is directed toward the surface.

Figure 4:
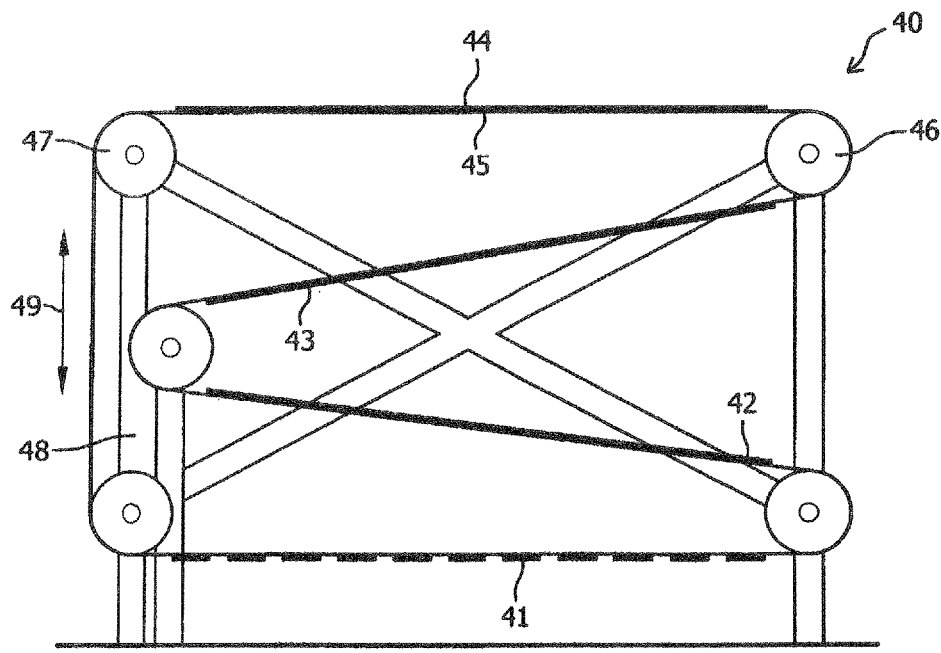
FIG. 4 shows a schematic view of a fourth embodiment of a device according to the present invention.

FIG. 4 shows a subsequent embodiment 40 of the device according to the present invention, wherein functional elements 41, 42, 43, 44 are likewise arranged on a belt 45. In the shown situation the functional element 44 is active. Belt 45 is incorporated in a construction with an upright 48 which is movable. The angle at which the portion of belt 45 situated between outer ends 46 and 47 of the uprights of the device lies relative to the surface can be changed by sliding upright 48 in the direction of arrow 49. An optimum angle for the active functional element can in this way be adjusted.

Figure 5:
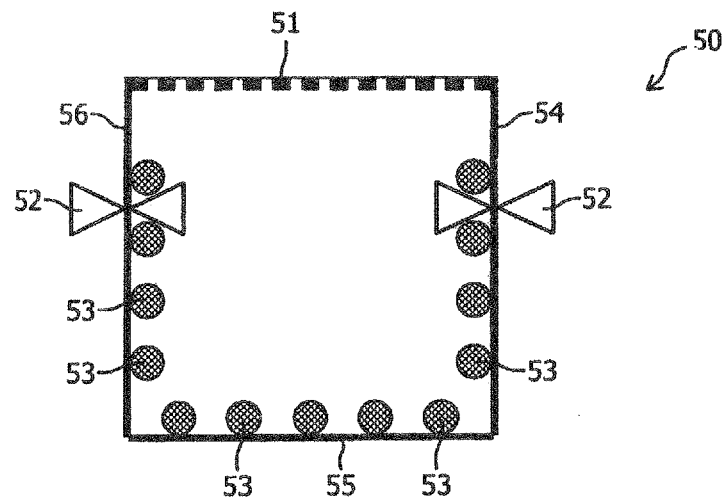
FIG. 5 shows a schematic view of a section of a carrier with functional elements for use in a device according to the present invention.

FIG. 5 shows a schematic cross-sectional view of a carrier 50 for use in a device according to the present invention. The carrier is provided with functional elements 51, 54, 55, 56, wherein functional element 51 is embodied as a liquid-permeable cloth. Liquid such as precipitation can be collected in carrier 50 by directing the liquid-permeable cloth 51 to a side from which precipitation can fall. The carrier is embodied for this purpose as an at least partially hollow tube in which a number of elements 53 are arranged for the purpose of holding the liquid. Overflows 52 are also arranged which serve the purpose of keeping the liquid level below a predetermined maximum.

Figure 6:
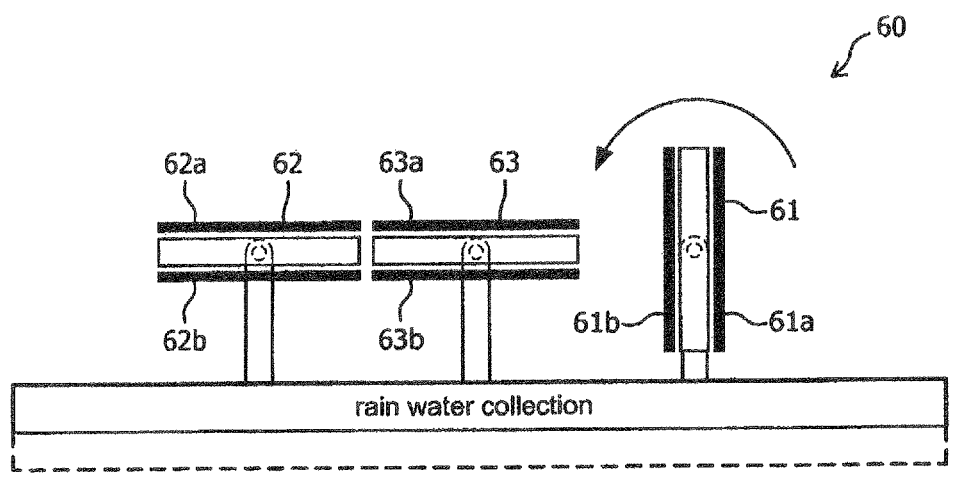
FIG. 6 shows a schematic view of a section of an alternative carrier intended particularly for rainwater collection according to the present invention.

FIG. 6 shows a schematic view of a section of an alternative embodiment 60 of the present invention. The device is provided with three carriers 61, 62, 63, of which at least the sides 61a, 62a, 63a are adapted to allow through rainwater. Sides 61b, 62b, 63b can be adapted for any other functionality. Carriers 62 and 63 are shown in a mode suitable for collecting rainwater, while carrier 61 is shown in a mode suitable for relinquishing rainwater. It is possible to opt to collect the rainwater with the purpose of recovering the water, but it is also possible to have collection take place with the intention of preventing overload of the water drainage or a sewer system.

Figure 7:
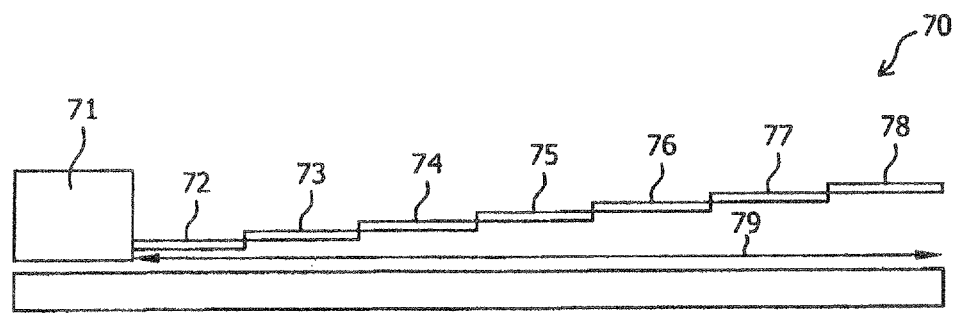
FIG. 7 shows a schematic view of a fifth embodiment of a device according to the present invention.

FIG. 7 shows a schematic view of a fifth embodiment 70 of a device according to the present invention. In this embodiment a storage unit 71 houses a plurality of carriers, of which carriers 72-78 are shown in an active mode, wherein they cover surface 79. The carriers can be placed in an active mode by means of translation parallel to surface 79 or be interchanged with other carriers (not shown) incorporated in the storage unit. Carriers 72-78 can also be placed in their active mode above a functional element which is arranged on surface 79 and which can be activated by incorporating carriers 72-78 in the storage unit.

Figure 8:
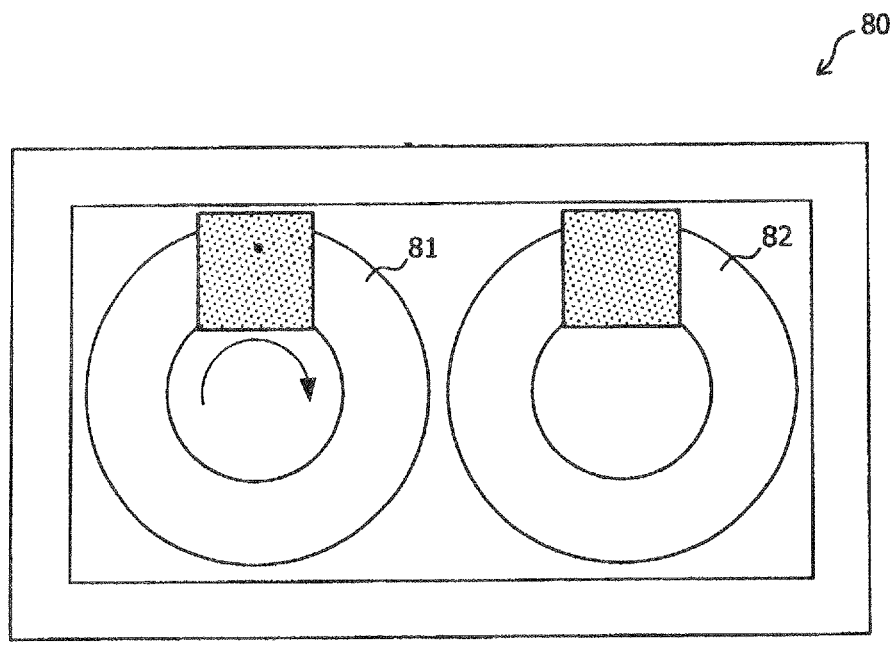
FIG. 8 shows a schematic view of a sixth embodiment of a device according to the present invention.

FIG. 8 shows a schematic view of a following embodiment 80, wherein the storage unit comprises a plurality of functional elements 81, 82 which can be arranged on the surface in accordance with a jukebox or carrousel principle. Many variations are possible in addition to the embodiments shown, all being deemed to fall within the scope of protection of the following claims.

Figure 9:
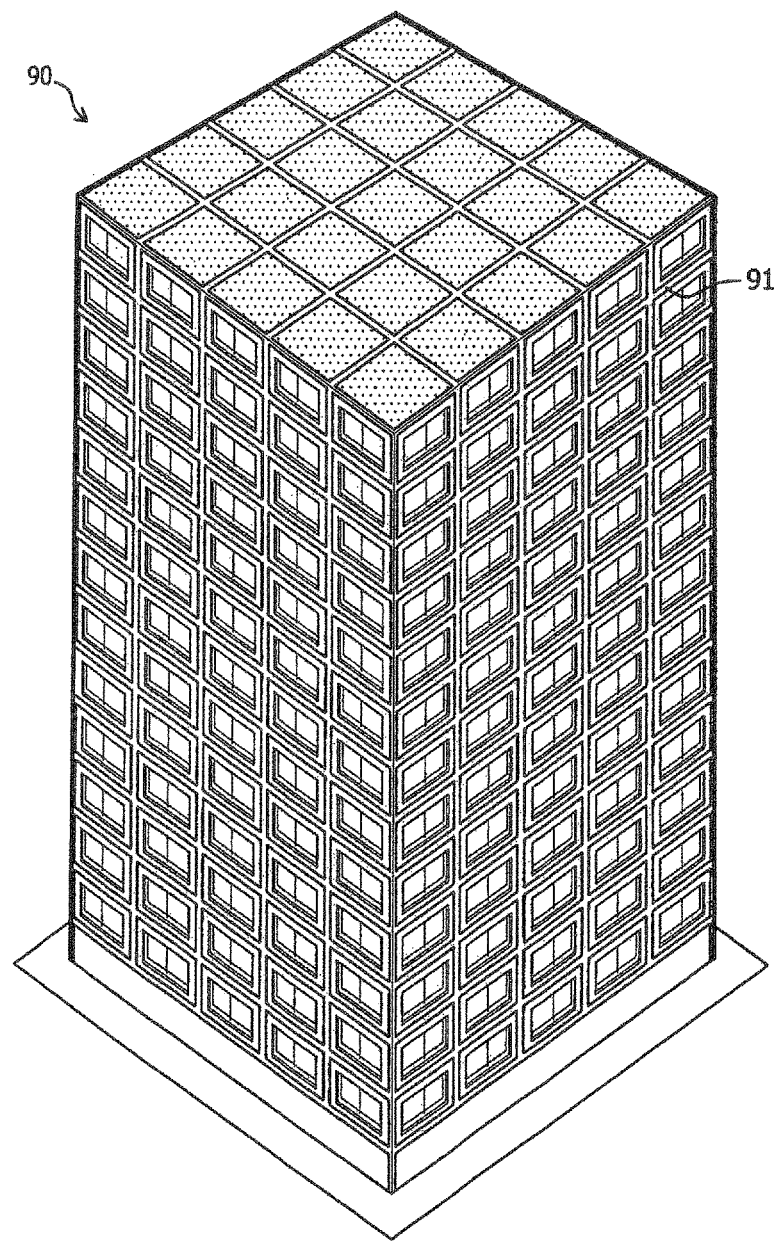
FIG. 9 shows a schematic view of a building round which is arranged a carrier frame on which the device according to the present invention is arranged.
Figure 10A:
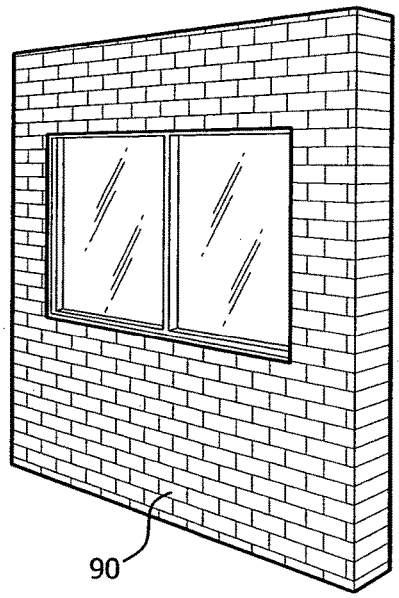
FIGS. 10a-d show a part of building on which a carrier structure is arranged.
Figure 10B:
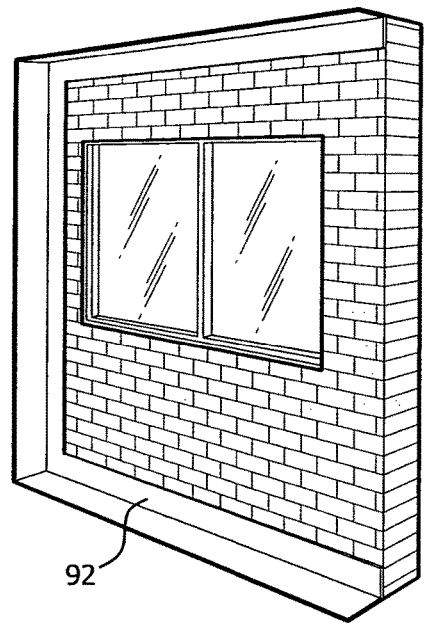
Figure 10C:
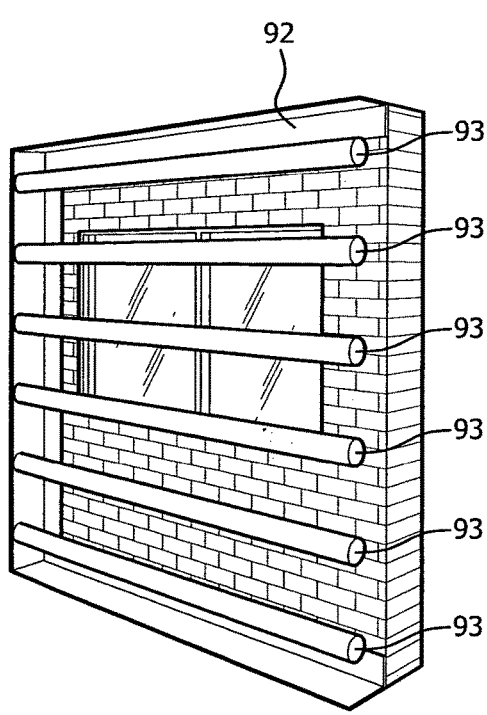
Figure 10D:
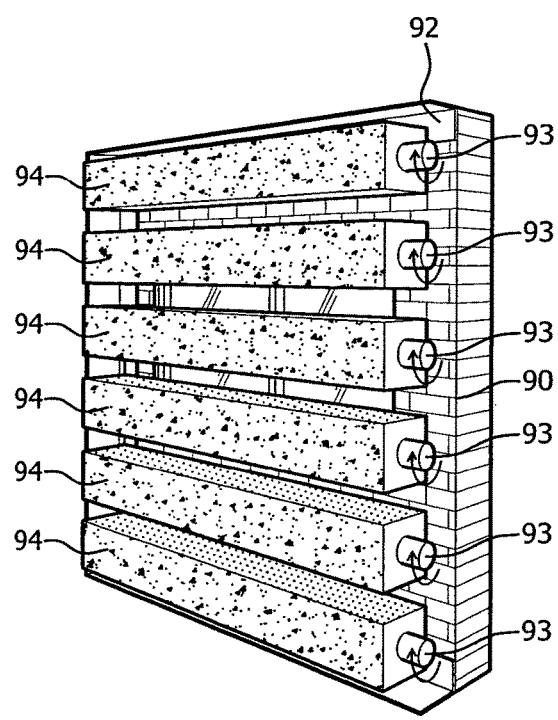

FIG. 9 shows a schematic view of a building 90 around which is arranged a carrier frame 91 on which the device according to the present invention is arranged.

FIGS. 10a-d show a part of building 90 on which a carrier structure is arranged for containing the device for utilizing the surface according to the present invention. Shown is how a frame 92 is arranged on which are situated rotation shafts 93 which hold carriers 94 formed by cassettes for rotation about shafts 93.

The invention claimed is:

1. A device for utilizing a surface for a variable function, comprising:
    a first functional element with an active surface area the size of at least a part of the surface;
    at least one second functional element with an active surface area the size of at least a part of the surface,
    wherein the first functional element and the at least one second functional element differ from each other; and
    a rotatable carrier for varying, on at least a part of the surface, the first and the at least one second functional elements with which the surface is utilized, whereby at least two of the first and the at least one second functional elements are carried such that during rotation of the carrier a corresponding first active surface area of at least one of the first and the at least one second functional elements is rotated out of place from a first predetermined orientation to the surface and a corresponding second active surface area of another one of the first and the at least one second functional elements is placed at a second predetermined orientation to the surface, wherein at least one of the first and the at least one second functional elements is chosen from the group consisting of:
    an element wherein the active surface area comprises an algal culture (bioenergy), a food culture, or artificial grass; a fine dust-binding element; an emission-neutralizing element; and a wind energy generating element,
    wherein the carrier comprises a tube which is rotatable in an axial direction and has a triangular or square cross-section, wherein at least one surface of a jacket of the tube carries at least one of the first and the at least one second functional elements.

2. The device as claimed in claim 1, wherein the carrier is adapted in at least one axial angle position to hold a liquid.

3. The device as claimed in claim 1, wherein the carrier has an at least partially moisture-permeable jacket for the purpose of absorbing, relinquishing, or absorbing and relinquishing a liquid.

4. The device as claimed in claim 1, comprising a control device for varying at least one of the first and the at least one second functional elements on the basis of an input.

5. The device as claimed in claim 4, wherein the input comprises a manual input or an input provided by a sensor or external device.

6. An assembly utilizing a surface for a variable function, comprising: a plurality of the device of claim 4, coupled to a central unit adapted to control the overall desired functionality by means of the input for the purpose of providing an input to each of the respective devices.

7. The assembly as claimed in claim 6, wherein the assembly is arranged on a carrier frame placed against, above or around a surface to be utilized or a building.

8. A method for utilizing a surface for a variable function, comprising the step of:
    varying, on at least a part of the surface, an active surface area of a first functional element covering the surface or an active surface area of at least one second functional element covering the surface,
    wherein the first functional element and the at least one second functional element differ from each other,
    wherein a rotatable carrier is configured to vary, on at least a part of the surface, the first and the at least one second functional elements with which the surface is utilized,
    wherein the rotatable carrier comprises a tube which is rotatable in an axial direction and has a triangular or square cross-section, wherein at least one surface of a jacket of the tube carries at least one of the first and the at least one second functional elements, and
    wherein at least one of the first and the at least one second functional elements is chosen from the group consisting of:
    an element wherein the active surface area comprises an algal culture (bioenergy), a food culture, or artificial grass; a fine dust-binding element; an emission-neutralizing element; and a wind energy generating element.

9. The method as claimed in claim 8, further comprising the step of replacing at least a part of an active surface area of the first functional element with an active surface area of the second functional element.

10. The method as claimed in claim 8, wherein varying the active surface area of the functional element covering the surface comprises of translating or rotating at least a part of the functional element.

* * * * *